United States Patent [19]

Burnard et al.

[11] Patent Number: 5,346,251
[45] Date of Patent: Sep. 13, 1994

[54] OVERPRESSURE REGULATING AIRBAG INFLATOR

[75] Inventors: Dennis W. Burnard, Roseville; Steven Kmenta, Canton; Timothy E. Hughes, Livonia, all of Mich.

[73] Assignee: Automotive Systems Laboratory, Inc., Farmington Hills, Mich.

[21] Appl. No.: 96,477

[22] Filed: Jul. 22, 1993

[51] Int. Cl.⁵ ............................................. B60R 21/26
[52] U.S. Cl. ..................................... 280/737; 280/741
[58] Field of Search .................... 280/728 R, 736, 737, 280/739, 741, 742

[56] References Cited

U.S. PATENT DOCUMENTS

| | | | |
|---|---|---|---|
| 4,066,415 | 1/1978 | Kasama et al. | 280/741 |
| 4,561,675 | 12/1985 | Adams et al. | 280/741 |
| 4,964,652 | 10/1990 | Karlow | 280/739 |

*Primary Examiner*—Kenneth R. Rice
*Attorney, Agent, or Firm*—Lyman R. Lyon

[57] ABSTRACT

An inflator for an inflatable vehicle occupant restraint system comprises a housing with an arcuate stress concentration groove therein of reduced cross section relative to the remainder of the housing whereby the groove ruptures upon the occurrence of a predetermined pressure internally of the housing.

2 Claims, 1 Drawing Sheet

OVERPRESSURE REGULATING AIRBAG INFLATOR

BACKGROUND OF THE INVENTION

A typical airbag inflator comprises a steel or aluminum housing having walls of a thickness related to the gas production characteristic of the pyrotechnic utilized. Since the combustion pressure of a pyrotechnic is related to ambient temperature, the walls of conventional inflators are required to be relatively thick so as to contain the maximum gas pressure exhibited under high ambient temperature conditions. As a result, the inflator used in an inflatable vehicle occupant restraint system is generally the heaviest component of the system. However, if pyrotechnic overpressures can be regulated as opposed to being contained, the walls of the inflator can be relatively thinner and therefore lighter, a highly desirable attribute.

A typical state-of-the-art airbag inflator exhibits only the natural failure mode of the pressure vessel. Such failure modes generally evidence: 1) large variations in burst mode; 2) large variations in burst pressure; 3) frequent burst in a welded region or burst that is weld related; 4) burst at high dynamic pressurization rates; and 5) fragmentation at failure. Burst failures that result in fragmentation of the housing thereby endangering a vehicle occupant cannot be tolerated.

SUMMARY OF THE INVENTION

The aforesaid problem is solved by employing a stress concentration groove to achieve controlled structural failure of an airbag inflator pressure vessel in the event of over pressurization. The stress concentration groove is passive and does not require auxiliary mechanical devices for control or activation. By designing a "weak point" into the pressure vessel, the internal pressure at structural failure, the location of the failure, and the mode of failure can be predetermined and systematically controlled.

Specifically, the invention comprises an arcuate groove which is strategically located in the surface of the pressure vessel. The groove is deliberately incorporated into the surface of the pressure vessel by coining, milling, cutting or burning, of the surface.

Hydroburst test of inflators utilizing the invention demonstrates that failure of the pressure vessel can be controlled to occur only along the groove.. The surface of the pressure vessel ruptures along the groove in a ductile fashion to permit pressure to escape, thereby preventing catastrophic rupture or fragmentation of the vessel.

DESCRIPTION OF THE PREFERRED EMBODIMENT

Figure 1:
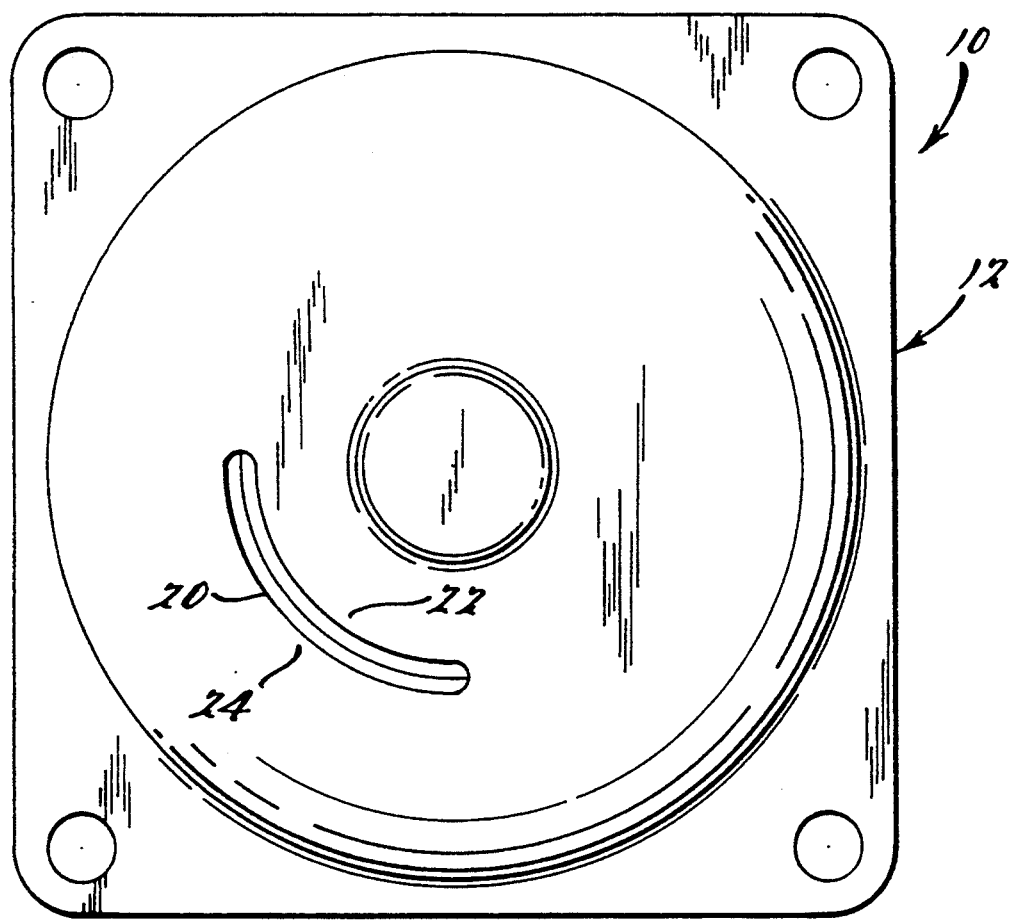
FIG. 1 is a top plan view of an inflator in according with the present invention.
Figure 2:
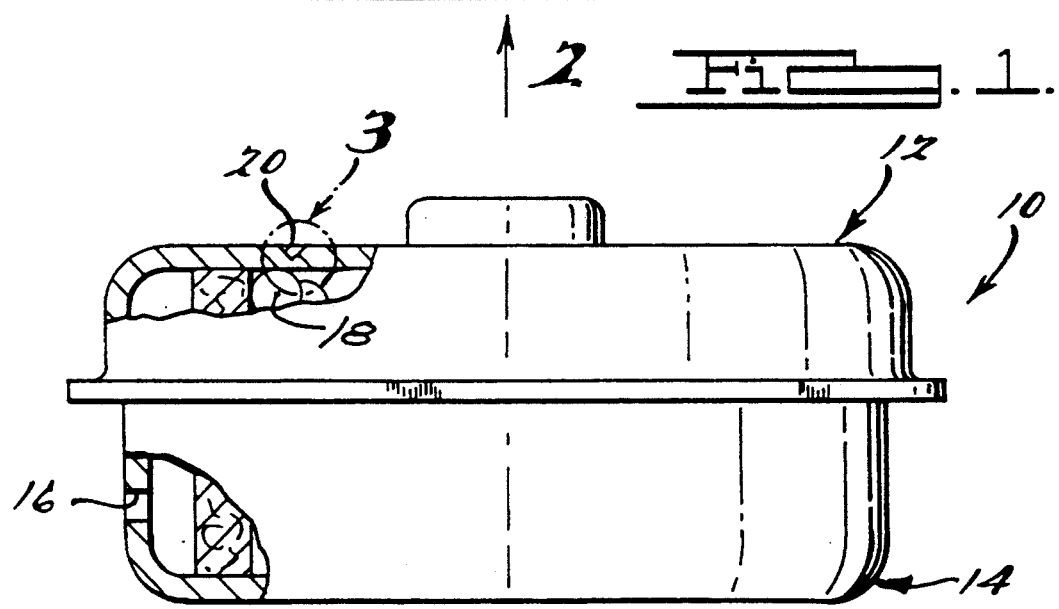
FIG. 2 is a view taken in the direction of the arrow "2" of FIG. 1.
Figure 3:
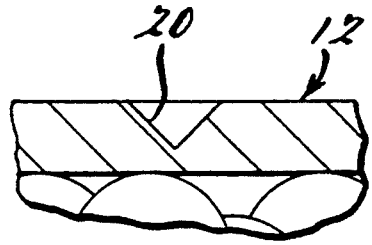
FIG. 3 is an enlarged view taken within the circle "3" of FIG. 2.

As seen in FIG. 1 of the drawing, an inflator 10, comprises two dish-shaped housing sections 12 and 14 that are welded together in inverted nested relationship. The lower housing section 14 contains a plurality of apertures 16 for the discharge of gas produced by combustion of a pyrotechnic 18.

In accordance with the present invention, the upper section 12 of the housing 10 is provided with an arcuate, passive, stress concentration groove 20 that ruptures upon the occurrence of a predetermined over pressure in the inflator 10. The groove 20 is arcuate to facilitate "peeling" of a convex portion 22 relative to a concave portion 24 of the housing 12.

The passive stress concentration groove 20 controls: a) pressure vessel burst pressure; b) burst failure location; and c) burst failure mode.

In operation, the stress concentration groove 20 requires no added external control or actuation device, and requires only minimal work e.g., coining, milling, burning, cutting, etc. to incorporate. An inflator utilizing the invention exhibits minimum variation in burst pressure. The invention provides a safe means of venting pressure in the case of over pressurization without concern for possible fragmentation or similar catastrophic rupture.

While the preferred embodiment of the invention has been disclosed, it should be appreciated that the invention is susceptible of modification without departing from the scope of the following claims.

I claim:

1. In an inflatable vehicle occupant restraint system comprising an inflator housing with a gas producing pyrotechnic therein,
   an improved overpressure regulating system for said inflator housing comprising an arcuate stress concentration groove in said housing of reduced cross section relative to the remainder of said housing whereby said groove ruptures upon the occurrence of a predetermined pressure internally of said housing.

2. The system of claim 1 wherein said stress concentration groove is of V-shaped cross section.

* * * * *